No. 890,743. PATENTED JUNE 16, 1908.
N. WINBERG.
WOODWORKING MACHINE.
APPLICATION FILED APR. 29, 1907.
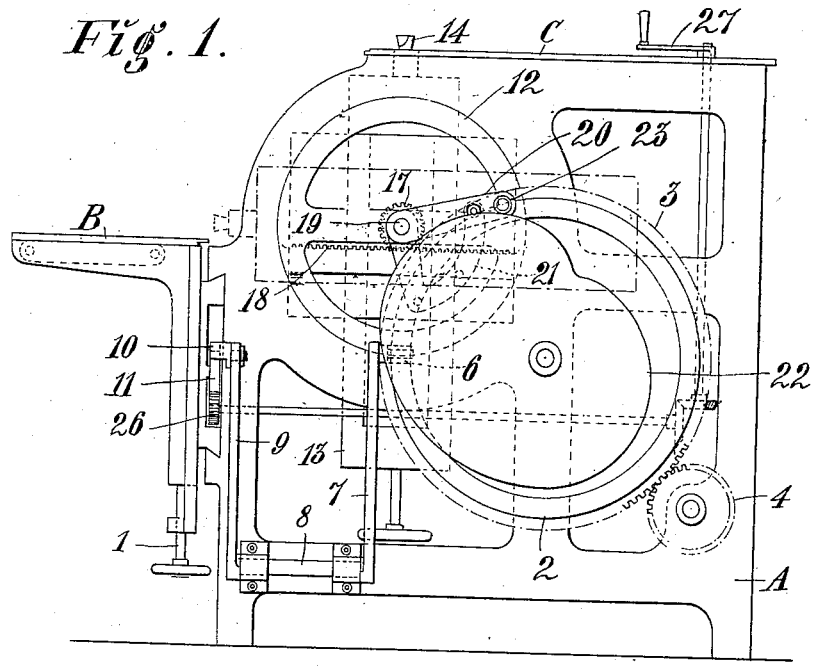
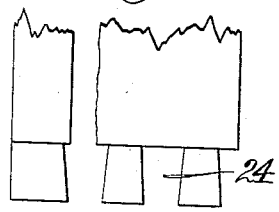
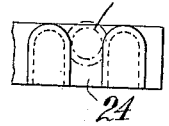
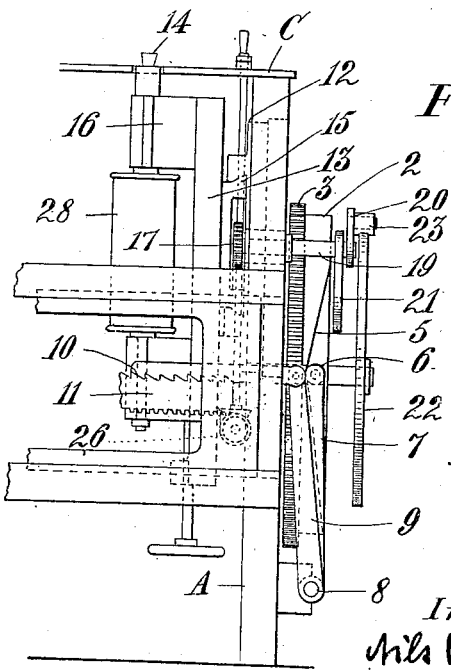
Witnesses
Inventor

UNITED STATES PATENT OFFICE.

NILS WINBERG, OF FRITZHEM, ÖSTERSUND, SWEDEN.

WOODWORKING-MACHINE.

No. 890,743.  Specification of Letters Patent.  Patented June 16, 1908.

Application filed April 29, 1907. Serial No. 370,861.

*To all whom it may concern:*

Be it known that I, NILS WINBERG, a subject of the King of Sweden, and resident of Fritzhem, Östersund, in the Kingdom of Sweden, have invented new and useful Improvements in Woodworking-Machines, of which the following is a specification, reference being had to the drawing accompanying and forming a part hereof.

This invention relates to improvements in woodworking machines and particularly to machines for making dovetails for boxes and other articles composed of joint pieces.

More particularly the invention relates to such machines of the type having a movable work-supporting table and a rotary cutting-tool.

The object of the invention is to provide a machine of the said kind adapted for any desired working of wood and particularly for producing dovetails having rounded surfaces corresponding to the shape of the cavities made by the same cutting-tool.

The invention consists, chiefly, in the cutting-tool being movable parallel to itself in a plane extending at right angles to the direction of movement of the work-supporting table, whereby the devices for performing the said movement of the cutting-tool may be made to coöperate with the devices for intermittently moving the work-supporting table in such a manner that, in producing dovetails, the cutting-tool is made to move a short distance away from and toward the work-supporting table during the time when the latter is moved from one working position to another.

The invention further consists in supporting the spindle of the cutting-tool in a circular slide in such a manner as to allow the said spindle of being moved relatively to the slide in a plane parallel thereto, viz. in the longitudinal direction of the spindle and in a direction at right angles thereto, whereby the spindle is not only movable in two directions at right angles to each other but is also adapted to be placed, by turning the slide, in any inclined position.

In the drawing, I have shown, by way of example, a combined wood-cutting and dovetailing machine constructed according to this invention.

Figure 1 is a side-elevation of the machine. Fig. 2 is an end-view thereof (the movable work-supporting table being partly removed.) Fig. 3 shows the dovetails in two positions at right angles to each other. Fig. 4 shows the dovetails seen from their ends (the cutting tool being indicated by dotted lines). Fig. 5 shows two cavities made in a piece of work for receiving the said dovetails.

The machine frame A (Figs. 1 and 2) is shown provided, at its top, with a table C secured or adjustably attached thereto. Arranged at the one (in Fig. 1 the left) end of the frame is a work-supporting table B movable in guides so as to be movable vertically by means of a screw 1 adapted to be turned by a hand wheel, and in a horizontal direction along the frame by means of a cam 2 or other means to be described. The cam is shown formed by an annular flange attached to or made integral with a cog-wheel 3 continually driven by a pinion 4 attached to a driving shaft, but the invention is not limited to this driving means, which is shown merely as an example. Held in contact with the cam flange 2 having a wedge-shaped depression 5 formed therein, is a roller 6 journaled at the free end of an arm 7 attached to a horizontally journaled rocking shaft 8. On account of the roller 6 being kept pressed, by a spring, weight or the like (not shown), against the cam flange 2, the shaft 8 will be caused to perform a rocking motion, whenever the roller 6 passes the depression 5 in the cam flange. Attached to the other end of the shaft 8 (left end, Fig. 1) is an arm 9, and connected to the said arm is a link 10, or the like, having at its underside one or more hooks engaging teeth formed on a rod 11, or the like, attached to the work-supporting table, the latter being thereby moved a predetermined distance for each rocking motion of the shaft 8 due to the roller 6 passing the depression 5 in the cam flange 2. As shown in Fig. 2, the teeth of the rod 11 are of such a form as to allow the hook or hooks of the link 10 to freely pass the said teeth, when the link is moving backward (toward the left in Fig. 2). The distance which the table is moved horizontally for each revolution of the cog-wheel 3 can be varied, for instance by changing the point of connection of the link 10 with the arm 9 or by exchanging the cam flange.

The described arrangement for intermittently feeding the work-supporting table horizontally is not essential but can be replaced by any arrangement suitable for the purpose.

The table B is shown in Fig. 1 in its lower working position. When desired, the table may be raised by means of the screw 1 so that its upper surface is placed on a level with the table C. The latter may, suitably, be arranged movably toward the table B so that the two tables B and C can be made to form one continuous plane.

If desired, the table B may, further, be arranged in such a manner as to allow of being placed at different angles of inclination.

Arranged in a circular slide 12 mounted in the frame in such a manner as to allow of being turned about its central axis is a usual cross-support 13 for the rotary spindle, said support consisting of two parts 15, 16, one 15 of which is movable in the circular slide 12 in a direction at right angles to the spindle, while the other part 16 is movable in the former one in the longitudinal direction of the said spindle. The part 15 of the cross-support mounted in the circular slide may be moved by means of a pinion 17 engaging a rack 18 (Fig. 1) attached to the said part 15. The pinion 18 is attached to a shaft 19 journaled in a hub connected to the circular slide 12 and carrying an arm 20 for turning the said shaft. In order to make it possible to adjust the position of the arm 20 in relation to the shaft 19 so that the said arm can be brought into the position relatively to the frame shown in Fig. 1, whatever be the position of the cutting-tool, the arm 20 is not firmly secured to the shaft 19 but arranged to be clamped to any desired point of the circumference of a sector 21 secured to the shaft 19. By turning the circular slide the cross-support and, thereby, the cutting-tool can be set at any desired angle between the vertical position shown by full lines in Fig. 1 and the horizontal position indicated by dotted lines in the same figure. By turning the arm 20 the spindle carrying the cutting-tool is moved parallel to itself. If the said spindle takes up the vertical position shown by full lines, it can, thus, by turning the arm 20 be caused to move parallel to itself toward and away from the table B in a horizontal direction at right angles to the direction of movement of the said table, (i. e. in the figure toward the left or the right hand side). If, on the contrary, the spindle takes up the horizontal position indicated by dotted lines, it can be raised or lowered by turning the said arm 20.

The turning of the arm 20 can, suitably, be performed automatically by means of a cam disk 22 attached to the shaft of the cog-wheel 3 and acting upon a roller 23 journaled at the free end of the arm 20 said roller being kept pressed by any suitable means against the circumference of the said cam disk.

Obviously, the parallel movement of the spindle carrying the cutting-tool can be performed otherwise than by a crank-shaft and a cog-wheel coöperating with a rack. Any means suitable for the purpose may be employed without departing from the spirit and scope of my invention. Nor is the means for setting the tool-carrying spindle at different angles of inclination limited to the circular slide illustrated.

When the machine is to be used for making dovetails, the tool-carrying spindle is turned into the horizontal position indicated by dotted lines in Fig. 1 (the rack 18 being, thereby, caused to take up a vertical position), and the table B is placed in the lower working position shown in the said figure. The conical cutting-tool carried by the spindle is then caused, by the turning of the arm 20 actuated by the cam disk 22, to descend and cut through the material to be worked from the top downwardly. By this means a vertical slot 24 (Fig. 3) widening inwardly like a dovetail is formed in the working piece. The rotary cutting-tool is then caused to ascend, the work-supporting table B is moved horizontally by the cam flange 2 into the next working position, and a new slot is formed in the working piece by causing the cutting-tool to again descend, and so on.

The cavities 25 shown in Fig. 5 are produced by the same cutting-tool 14 which is then placed in the vertical position shown by full lines in Fig. 1. The table B is then placed, by the screw 1, on a level with the table C. By turning the arm 20 the tool-carrying spindle is made to penetrate into the working piece, thereby cutting grooves 25 therein of the shape shown in Fig. 5. These grooves or cavities are, as shown in Fig. 5, round in their bottoms, and it is, therefore, necessary, for making tight joints, to round off the dovetails remaining between the slots 24, as shown in Fig. 4. Such a rounding of the dovetails is, suitably, performed by placing the cams 2 and 22 in such positions relatively to each other that the horizontal movement of the work supporting table B will take place during the time when the cutting-tool 14 passes, i. e. rises into and descends from its uppermost position (see Fig. 4).

In case it be desired to rapidly move the work-supporting table in the horizontal direction, the link 10 is lifted out of engagement with the work-supporting table, whereupon the latter can be rapidly moved by means of a pinion 26 engaging with cogs on the underside of the rod 11, said pinion being connected by suitable gearing to a crank 27 by which the pinion can be turned in one or the other direction.

The belt pulley 28 employed for rotating the tool-carrying spindle is, suitably, placed in such a position that the spindle is turned, during the turning of the circular slide, about the center of the said pulley.

As before stated, the invention is not limited to the particular form of construction illustrated, since the construction may be changed in various ways without departing from the spirit of my invention.

Having now described my invention, what I claim as new and desire to secure by Letters Patent is:

1. In a wood-working machine the combination of a frame, a work-supporting table movably mounted in the said frame, a slide mounted in the frame in such a manner as to be able to turn about an axis, a carrier slidably mounted in the said slide, a rotary spindle journaled in the said carrier, a cutter carried by the said spindle, means for reciprocating the carrier in the slide in a direction toward and away from the work-supporting table, and means for intermittently feeding the work-supporting table, said means coöperating with the means for reciprocating the carrier in such a manner that the feeding of the table will take place during the last part of the movement of the carrier away from and the first part of the carrier toward the said table, substantially as and for the purpose set forth.

2. In a wood-working machine the combination of a frame, a work-supporting table movably mounted in the said frame, a rotary cam operating the said table in such a manner as to impart to the latter an intermittent movement, a circular slide mounted in the frame in such a manner as to be able to turn about an axis parallel to the direction of the said movement of the table, a carrier slidably mounted in the said slide, a rotary spindle journaled in the said carrier, a cutter carried by the said spindle, and a cam for reciprocating the carrier in a direction toward and away from the work-supporting table, said cam being placed in such a position relatively to the cam for intermittently feeding the table that the said feeding movement will take place during the last part of the movement of the cutter away from and the first part of the movement of the cutter toward the said table, substantially as and for the purpose set forth.

3. In a wood-working machine the combination of a frame, a work-supporting table movably mounted in the said frame, a rotary cam operating the said table in such a manner as to impart to the latter an intermittent feeding movement, a circular slide mounted in the frame in such a manner as to be able to turn about a central axis parallel to the direction of the said movement of the table, a cross-support one part of which is slidably mounted in the said slide, a rotary spindle journaled in the other part of the said cross-support, a cutter carried by the said spindle, a shaft journaled in the center of the circular slide, a wheel secured to the said shaft, said wheel engaging teeth in the part of the cross-support mounted in the circular slide, an arm attached to the said shaft, and a cam reciprocating the said arm and, thereby, the cross-support in such a manner that the cutter is moved toward and away from the work-supporting table, said cam being placed in such a position relatively to the cam for intermittently feeding the table that the said feeding movement will take place during the last part of the movement of the cutter away from and the first part of the movement of the cutter toward the said table, substantially as and for the purpose set forth.

4. In a wood-working machine the combination of a frame, a work-supporting table movably mounted in the said frame, a rotary cam operating the said table in such a manner as to impart to the latter an intermittent feeding movement, a circular slide mounted in the frame in such a manner as to be able to turn about a central axis parallel to the direction of the said movement of the table, a cross-support one part of which is slidably mounted in the said slide, a rotary spindle journaled in the other part of the said cross-support, a cutter carried by the said spindle, a shaft journaled in the center of the circular slide, a wheel secured to the said shaft, said wheel engaging teeth in the part of the cross-support mounted in the circular slide, a sector secured to the said shaft, an arm mounted on the said shaft and adapted to be clamped to any desired point of the circumference of the said sector, and a cam reciprocating the said arm and, thereby, the cross-support in such a manner that the cutter is moved toward and away from the work-supporting table, substantially as and for the purpose set forth.

5. In a wood-working machine the combination of a frame, a work-supporting table movably mounted in the said frame, a rotary cam operating the said table in such a manner as to impart to the latter an intermittent feeding movement, a circular slide mounted in the frame in such a manner as to be able to turn about a central axis parallel to the direction of the said movement of the table, a cross-support one part of which is slidably mounted in the said slide, a rotary spindle journaled in the other part of the said cross-support, a cutter carried by the said spindle, a pulley mounted on the latter in such a position as to turn about its middle plane, when the slide is turned about its center, and means for reciprocating the cross-support in the slide in a direction toward and away from the work-supporting table, substantially as and for the purpose set forth.

In testimony whereof I have signed my name to this specification in the presence of two subscribing witnesses.

NILS WINBERG.

Witnesses:
LARS E. KARLSSON,
FR. JOHANSSAN.